Figure 1:
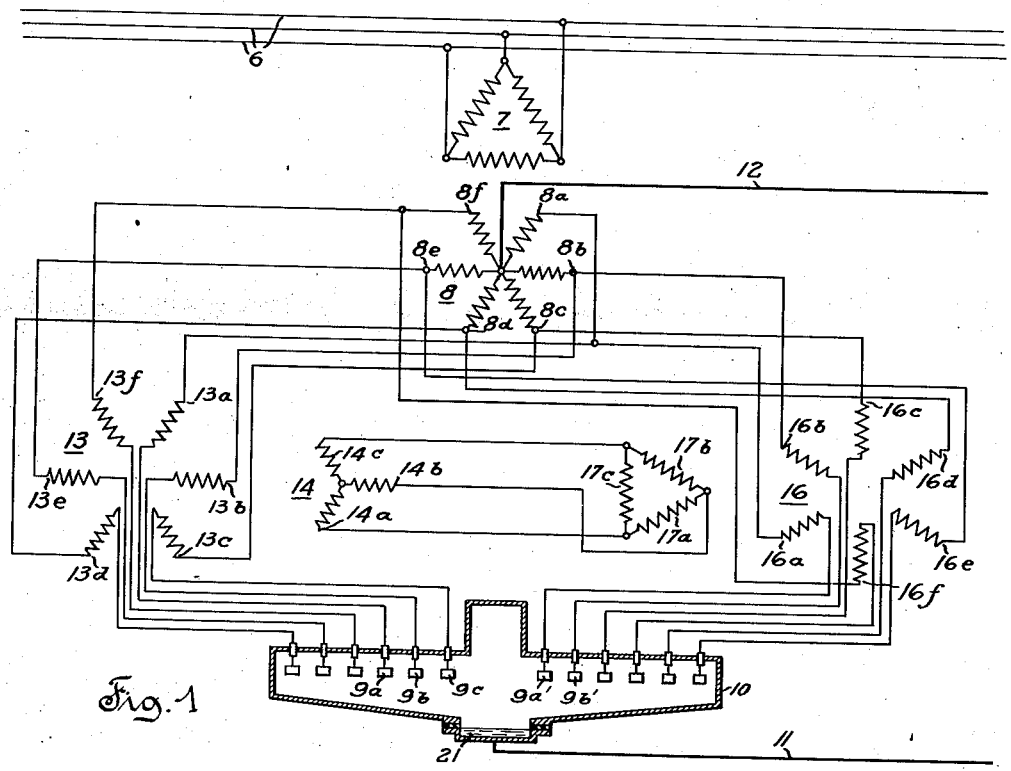

March 19, 1935.  E. KERN ET AL  1,994,715
ELECTRIC CURRENT RECTIFYING SYSTEM
Filed Sept. 26, 1932   2 Sheets-Sheet 1

Inventors
E. Kern
H. Meyer-Delius
by
Attorney

Patented Mar. 19, 1935

1,994,715

UNITED STATES PATENT OFFICE 1,994,715

ELECTRIC CURRENT RECTIFYING SYSTEM

Erwin Kern, Ennetbaden, Switzerland, and Heinrich Meyer-Delius, Heidelberg-Schlierbach, Germany, assignors to Aktiengesellschaft Brown Boveri & Cie., Baden, Switzerland, a joint-stock company of Switzerland Application September 26, 1932, Serial No. 634,916
In Germany September 26, 1931

16 Claims. (Cl. 175—363)

This invention relates to improvements in electric current rectifying systems and more particularly to means for supplying a polyphase rectifier or a group of single phase rectifiers with currents of a number of phases greater than the number of phases of the alternating current supply line.

Rectifiers of the different types known in the art, and more particularly rectifiers of the gaseous or of the metallic vapor arcing type, are most frequently supplied from three phase alternating current supply lines with which they are connected by means of suitable transformers. To obtain satisfactory output voltage regulation in a rectifying system and to reduce the voltage ripple in the direct current output circuit thereof, the number of phases of the transformer secondary winding is usually increased from three to six by the connection of the middle points of the several winding portions thereof to a common neutral point. The number of transformer secondary phases is also frequently increased to a number greater than six by the use of additional secondary windings or by suitable interconnection of portions of the same secondary winding which is then provided with taps to permit such interconnection. The transformer then becomes complicated in its construction and expensive to build, more particularly at high voltages because the interconnection between windings or between the taps thereof are difficult to insulate and must be given large clearances within the tank of the transformer. Such disadvantages are entirely obviated by providing the supply transformer with a six phase secondary winding and by increasing the number of phases above six in a separate structure connected only in the anode circuits and therefore not presenting any difficulties in construction and particularly in regard to insulation. Such structure will generally provide magnetic linkages between the several anode circuits of the rectifier and will, therefore, cause simultaneous operation of two or more of the anodes connected with one or more phases of the supply transformer.

It is, therefore, one object of the present invention to provide a rectifying system in which the several anode circuits are magnetically interlinked.

Another object of the invention is to provide a rectifying system in which the several anode circuits are magnetically interlinked by means of a single magnetic structure.

Another object of the invention is to provide a rectifying system in which the several anode circuits are magnetically interlinked for obtaining simultaneous operation of two or more of the rectifier anodes.

Another object of the invention is to provide a rectifying system in which the several anode circuits are magnetically interlinked for obtaining operation of the several anodes at a number of phases greater than the number of phases of the supply transformer secondary winding connected therewith.

Figure 2:
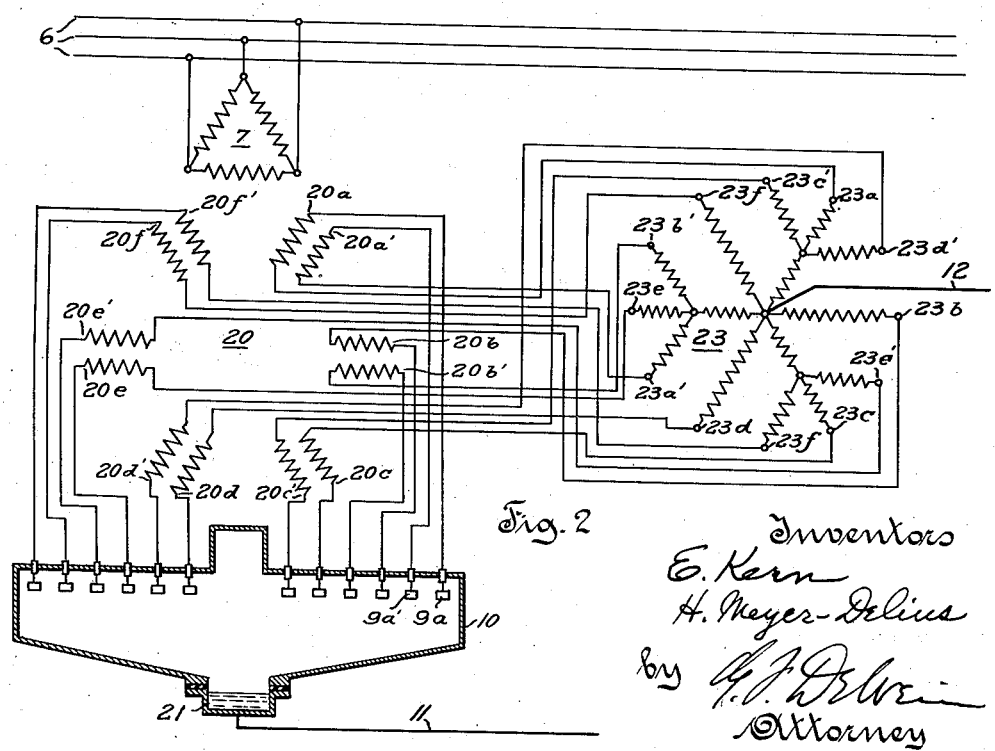
Figure 3:
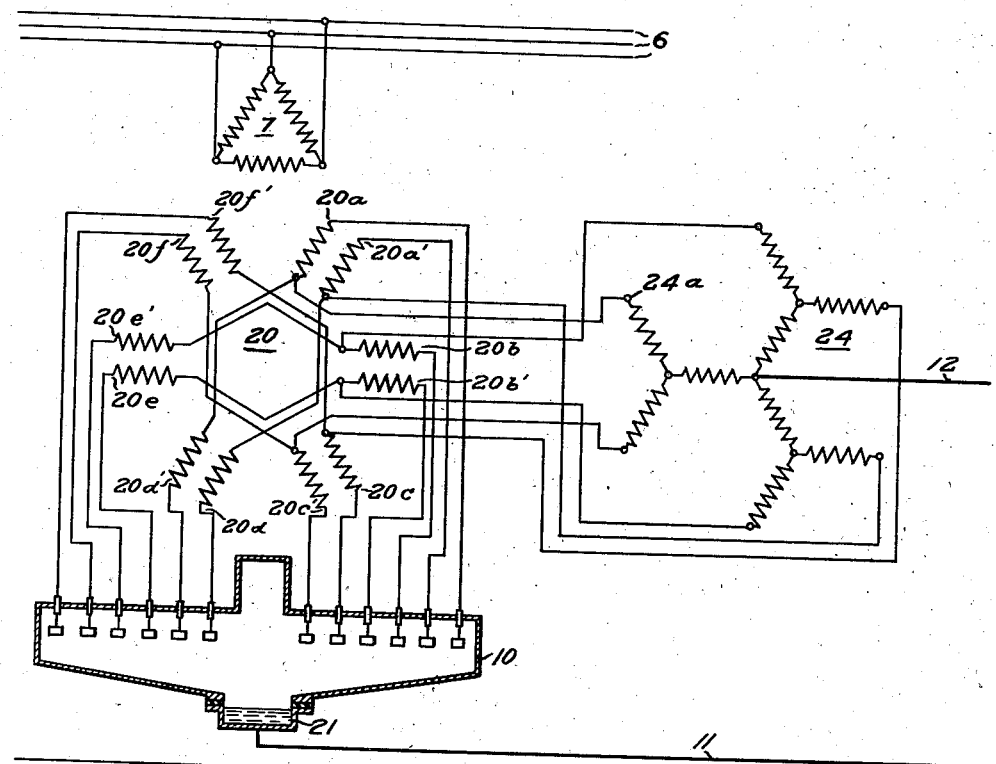
Figure 4:
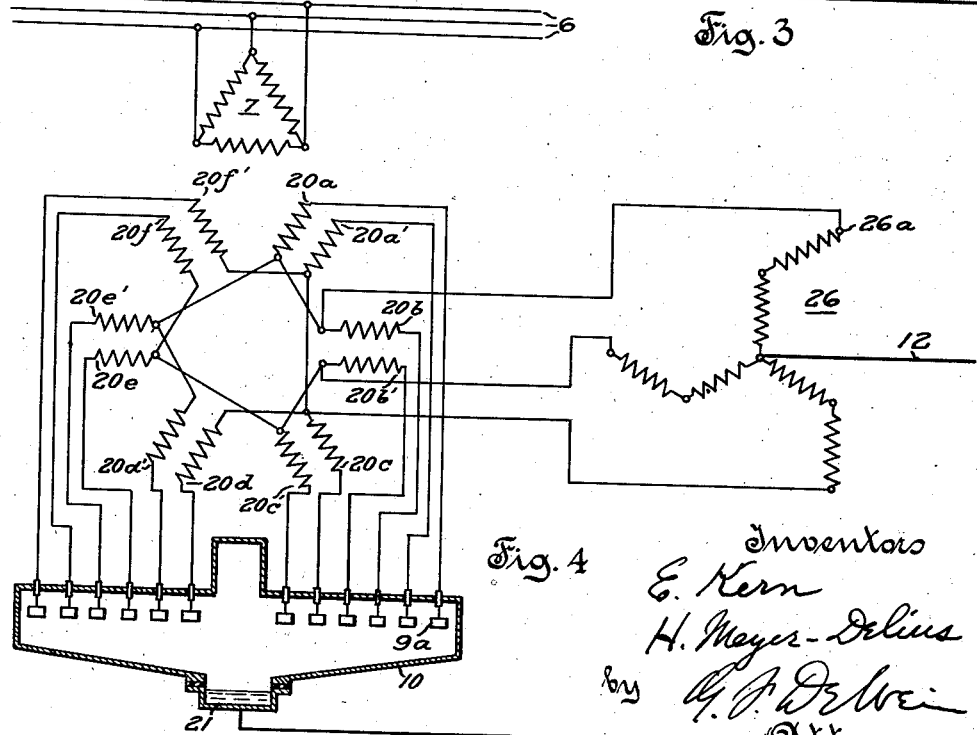

Objects and advantages other than those above described will be apparent from the following description when read in connection with the accompanying drawings, in which:

Fig. 1 diagrammatically illustrates one embodiment of the present invention showing a 12 phase rectifying system employing an electric current rectifier of the metallic vapor arcing type, in which the anode circuits are interlinked by means of two polyphase balancing transformers located between the anodes and the supply transformer secondary windings and conductively interconnected;

Fig. 2 diagrammatically illustrates a modified embodiment of the present invention differing from that shown in Fig. 1 in that the anode circuits are interlinked by means of a single polyphase balancing transformer located between the supply transformer secondary winding and the output circuit;

Fig. 3 diagrammatically illustrates another modified embodiment of the present invention differing from that shown in Fig. 2 in that each circuit of the balancing transformer is common to two anode circuits; and Fig. 4 diagrammatically illustrates a further modified embodiment of the present invention differing from that shown in Fig. 2 in that each circuit of the balancing transformer is common to four anode circuits.

Referring more particularly to the drawings by characters of reference, reference numeral 6 designates a polyphase alternating current supply line shown as a three phase line because such type of line is most frequently utilized in practice. The rectifying system includes a transformer having a primary winding 7 herein illustrated as being connected in delta and receiving current from line 6. The transformer secondary winding, generally represented by 8, comprises a plurality of winding portions 8a, 8b, 8c, 8d, 8e and 8f connected to form a neutral point to which is connected one of the conductors 12 of a direct current output circuit. The terminals of the winding portions are severally connected with anodes 9a, 9b, etc. and 9a', 9b', etc. of a rectifier 10. Rectifier 10 is shown as being of the metallic vapor arcing type having a cathode 20 of vaporizable material such as mercury connected with the second conductor 11 of the direct current output circuit. It will be understood that rectifier 10 may be replaced by a plurality of single phase rectifiers of the gaseous or metallic vapor arcing type having their anodes severally connected with the portions of winding 8 and their cathodes connected in common with conductor 11. Rectifier 10 may also be replaced by a polyphase rectifier or by a plurality of single rectifiers of the high vacuum type which, however, introduce the well known limitations of rectifiers of this character into the system. Rectifier 10 may further be replaced by a plurality of single phase rectifiers of the contact type such as the well known copper oxide rectifiers. Each portion of winding 8 such as 8a is connected with an anode 9a of rectifier 10 through one of the winding portions such as 13a of a balancing transformer having a primary winding 13 and a secondary winding 14 and with a second anode 9a' through a winding portion 16a of a second balancing transformer having a primary winding 16 and a secondary winding 17. Windings 14 and 17 are conductively connected and are connected in star and in delta respectively to permit such conductive connection even though the respective portions thereof receive currents displaced in phase relative to each other.

In operation, assuming that winding 7 is energized from line 6, winding 8 receives six phase alternating current voltages of which the voltage in winding portion 8a may be assumed as being the highest at the moment of operation considered. A current then flows from winding 8a to winding 13a, anode 9a, cathode 20, conductor 11 and conductor 12 back to the neutral point of winding 8. A current also flows from winding 8a to winding 16a, anode 9a', cathode 20, conductor 11 and conductor 12 to the neutral point of winding 8. The flow of current in winding 16a induces a current in winding 17a, and the flow of current in winding 13a induces a current in winding 14a. The currents in windings 14a and 17a circulate in a closed circuit comprising winding 14a, winding 17a and winding 14b. The flow of such current will tend to magnetize the cores of transformers 13, 14 and 16, 17 in such manner as to oppose the potential of winding 8a and as to add to the potential of winding 8b to the end that the voltages impressed between anodes 9a, 9a' and 9b and the cathode 20 of rectifier 10 may become equal, thereby forcing simultaneous flow of current in anodes 9a, 9a' connected with winding 8a and 9b connected with winding 8b. At a later moment of operation, the voltage of winding portion 8b becomes the highest of the secondary voltages and current will flow from winding portion 8b through windings 13b and 16b in a manner similar to that previously described for winding portion 8a. Current will, therefore, be induced in windings 14b and 17b and will circulate in the circuit comprising windings 14b, 14c and 17b. By a process similar to that described above the flow of such currents will force simultaneous operation of anodes 9b, 9b' and 9c. At a further moment of operation winding portion 8c has the highest potential and current will flow through windings 13c and 16c, thereby inducing currents in windings 14c and 17c, which currents also circulate through winding 14a. Flow of such currents will then force simultaneous operation of anodes 9a, 9c and 9c'. It will be seen from the above that anodes 9a' and 9b' operate at an interval of one-sixth of a cycle in response to the sequential energization of winding portions 8a and 8b connected therewith as in the well known six phase rectifier connection. Anode 9b, however, operates during one-half of its working period simultaneously with anode 9a' and during the second half of its working period operates simultaneously with anode 9b', thus receiving current of a phase intermediate between that of winding portion 8a and winding portion 8b. It will appear that, by a similar process, anodes 9c, 9d, etc. will operate at phases intermediate the phases of anodes 9b, 9c' etc. so that all of the anodes of the rectifier receive currents constituting substantially a twelve phase system although such anodes are supplied from a six phase transformer secondary winding. It will also appear that each anode such as 9b operates simultaneously during one-half of its working period with anode 9a and during the other half of its working period operates simultaneously with anode 9c and in general that each anode operates simultaneously with another anode which is energized one-sixth of a cycle earlier or later so that the present system also operates in the manner of an interphase transformer for lengthening the period of operation of each anode thereby increasing the efficiency of the system and improving its operating characteristics.

It will be understood that the flow of current through the several anodes of the rectifier and through windings 13 and 16 induces polyphase voltages in such windings which voltages constitute a system of twelve phase voltages because of the particular interconnection of windings 14 and 17. Such system of twelve phase voltages may also be obtained by magnetically interlinking the different portions of windings 13 and 16 without interposition of conductively connected windings 14 and 17. The system may then be connected as shown in Fig. 2 in which the interlinkage of the anode circuits is obtained in a single magnetic structure 23. Balancing transformer 23 illustrated as an auto-transformer is provided with a plurality of winding portions assembled on a single three phase core for providing magnetic interlinkage therebetween. When the balancing transformer is connected with the output circuit as shown in Fig. 2, the supply transformer must be provided with a secondary winding 20 presenting six phase portions as is the case with winding 8 of Fig. 1 but in which each phase comprises two parallel winding portions each having one terminal connected with a terminal of the balancing transformer winding portions and another terminal connected with an anode of rectifier 10. By a process similar to that described above, flow of current through the several winding portions of secondary winding 20 induces twelve phase alternating current voltages in balancing transformer 23 thereby forcing operation of the anodes of rectifier 10 in substantially twelve phase sequence.

Operation similar to that described for the above two embodiments may be obtained in a similar system in which the balancing transformer is provided with a lesser number of winding portions. Each portion of the balancing transformer then being connected with two or more of the portions of secondary winding 20, the circuit of each winding portion of winding 20 receives a voltage which is somewhat different from that given previously. A balancing transformer 24 which again permits obtaining a substantially twelve phase system of voltages applied between the conductor 12 and each of the anodes of rectifier 10 is now used. The operation of the system is then substantially as described for the above two embodiments, and need not be repeated. In the embodiment illustrated in Fig. 3, twelve phase currents are obtained by the use of balancing auto-transformer 24 comprising a plurality of winding portions of which each portion supplies a voltage to two portions of winding 20 arranged 180 electrical degrees from each other. For instance, winding portion 24a introduces a voltage in the circuits of winding portions 20a and 20d' which, in the embodiment of Fig. 2, received voltages substantially equal and in phase with windings 23a and 23d.

In the embodiment illustrated in Fig. 4, each circuit of the balancing auto-transformer 26 is common to four circuits of transformer secondary winding 20. For instance, winding 26a is in the circuit of windings 20b, 20a, 20e', 20d', which, in the embodiment of Fig. 2, received voltages from winding portions 23a, 23d', 23b and 23e' with substantially the same result as in the connections shown in Fig. 4.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In an electric current rectifying system, an alternating current supply line, an electric current rectifier, a transformer having the primary winding thereof connected with said line, and means magnetically interlinking the anode circuits of said rectifier to cause such circuits to carry current of a number of phases greater than the number of phases of the secondary winding of said transformer.

2. In an electric current rectifying system, a polyphase alternating current supply line, an electron discharge device of the arcing type, a transformer having a primary winding connected with said line and a secondary winding divided into a number of phases greater than the number of phases of said line, and means magnetically interlinking the anode circuits of said rectifier to cause such circuits to carry currents of a number of phases greater than the number of phases of the secondary winding of said transformer.

3. In an electric current rectifying system, a polyphase alternating current supply line, an electron discharge device of the arcing type, a transformer having a primary winding connected with said line and a secondary winding divided into a number of phases greater than the number of phases of said line and forming a neutral point, means magnetically interlinking the anode circuits of said rectifier to cause such circuits to carry current of a number of phases greater than the number of phases of the secondary winding of said transformer, and a direct current output line having one conductor connected with said device and the other conductor connected with the neutral point of said transformer.

4. In an electric current rectifying system, a polyphase alternating current line, an electric current rectifier of the vapor arcing type having a plurality of anodes, a transformer connected with said line and with the anodes of said rectifier, and means magnetically interlinking the anode circuits of said rectifier to energize a greater number of such circuits than the number of phases of the current supplied thereto from the secondary winding of said transformer.

5. In an electric current rectifying system, a polyphase alternating current line, an electric current rectifier of the vapor arcing type having a plurality of anodes, a transformer having a primary winding connected with said line and a secondary winding divided into a number of phases greater than the number of phases of said line, each of the phases of the secondary winding being connected with a plurality of the anodes of said rectifier, and a single structure having a plurality of interconnected winding portions magnetically interlinking the anode circuits to cause such circuits to carry currents of a number of phases greater than the number of phases of the secondary winding of said transformer.

6. In an electric current rectifying system, a polyphase alternating current line, an electric current rectifier of the vapor arcing type having a plurality of anodes, a transformer having a primary winding connected with said line and a secondary winding divided into a number of phases greater than the number of phases of said line, and transformers having a plurality of magnetically interlinked winding portions conductively interconnecting a plurality of the anodes of said rectifier to supply potentials of approximately the same angular relation relative to each other and of a greater number of phases than the number of phases of the secondary winding of the first said transformer.

7. In an electric current rectifying system, a polyphase alternating current line, an electric current rectifier of the vapor arcing type having a plurality of anodes, a supply transformer having a primary winding connected with said line and a secondary winding, the number of anodes of said device being greater than the number of phases of the secondary winding of said transformer and a plurality of balancing transformers each having one winding of each thereof conductively interconnected and differently arranged relative to each other, the other winding of each of said balancing transformers conductively connecting the secondary winding of said supply transformer with the anodes of said rectifier.

8. In an electric current rectifying system, a polyphase alternating current line, an electric current rectifier of the vapor arcing type having a plurality of anodes, a transformer having a primary winding connected with said line, and a secondary winding divided into a number of phases greater than the number of phases of said line, the number of anodes of said device being greater than the number of phases of the secondary winding of said transformer and a plurality of transformers having conductively interconnected secondary windings, the primary windings of the last said transformers connecting the secondary winding portions of the first said transformer with the anodes of said rectifier.

9. In an electric current rectifying system, a polyphase alternating current line, an electric current rectifier of the vapor arcing type having a plurality of anodes, a transformer having a primary winding connected with said line to supply potential to said rectifier and a secondary winding, the number of anodes of said device being greater than the number of phases of the secondary winding of said transformer, and a plurality of balancing transformers having conductively interconnected secondary windings, a primary winding portion of each of said balancing transformers conductively connecting each of the secondary winding portions of said supply transformer severally connected with the anodes of said rectifier.

10. In an electric current rectifying system, a polyphase alternating current line, an electric current rectifier of the vapor arcing type having a plurality of anodes, a transformer having a primary winding connected with said line and a secondary winding, the number of anodes of said device being greater than the number of phases of the secondary winding of said transformer and a plurality of balancing transformers having primary windings conductively connected with the secondary winding of said supply transformer and having differently arranged conductively interconnected secondary windings to introduce potentials in the primary windings of said balancing transformers, the introduced potentials being potentials of phases other than those of the secondary winding of said supply transformer.

11. In an electric current rectifying system, a polyphase alternating current line, an electric current rectifier of the vapor arcing type having a plurality of anodes and a cathode, a transformer to supply current to the anodes of said rectifier and having a primary winding connected with said line and a secondary winding divided into a number of portions connected to form a neutral point, the number of anodes of said device being greater than the number of phases of the secondary winding of said transformer a direct current output line having one conductor thereof connected with the cathode of said rectifier and the other conductor thereof connected with the neutral point of said supply transformer, and a plurality of balancing transformers having one winding of each of said transformers conductively interconnected and differently arranged relative to each other, the other winding of each of said balancing transformers conductively connecting the secondary winding of said supply transformer with the anodes of said rectifier.

12. In an electric current rectifying system, a polyphase alternating current supply line, an electric current rectifier of the electron discharge type having a plurality of anodes and a cathode, a transformer having a primary winding connected with said supply line and a secondary winding divided into a number of phases greater than the number of phases of said line, the number of anodes of said device being greater than the number of phases of the secondary winding of said transformer the secondary winding portions being severally connected with the anodes of said rectifier, an auto-transformer having the windings thereof connected to form a neutral point and having each of the windings thereof conductively connected with a plurality of secondary winding portions of said supply transformer, and a direct current output line having one conductor thereof connected with the cathode of said rectifier and the other conductor thereof connected with the neutral point of said auto-transformer.

13. In an electric current rectifying system, a polyphase alternating current supply line, an electric current rectifier of the electron discharge type having a plurality of anodes and a cathode, a transformer having a primary winding connected with said supply line and a secondary winding divided into a number of portions, the number of anodes of said device being greater than the number of phases of the secondary winding of said transformer the secondary winding portions being severally connected with the anodes of said rectifier and being arranged in parallel pairs, an auto-transformer having the windings thereof connected to form a neutral point and having each of the windings thereof conductively connected with one pair of the secondary winding portions of said supply transformer, and a direct current output line having one conductor thereof connected with the cathode of said rectifier and the other conductor thereof connected with the neutral point of said auto-transformer.

14. In an electric current rectifying system, a polyphase alternating current supply line, an electric current rectifier of the electron discharge type having a plurality of anodes and a cathode, a transformer having a primary winding connected with said supply line and a secondary winding divided into a number of phases greater than the number of phases of said line, the number of anodes of said device being greater than the number of phases of the secondary winding of said transformer the secondary winding portions being severally connected with the anodes of said rectifier and being arranged in parallel pairs, an auto-transformer having the windings thereof connected to form a neutral point and having each of the windings thereof conductively connected with a plurality of pairs of secondary winding portions of said supply transformer, and a direct current output line having one conductor thereof connected with the cathode of said rectifier and the other conductor thereof connected with the neutral point of said auto-transformer.

15. In an electric current rectifying system, a polyphase alternating current supply line, an electric current rectifier of the electron discharge type having a plurality of anodes and a cathode, a transformer having a primary winding connected with said supply line and a secondary winding divided into a number of portions, the secondary winding portions being severally connected with the anodes of said rectifier, the number of anodes of said device being greater than the number of phases of the secondary winding of said transformer an auto-transformer having the windings thereof connected to form a neutral point and having each of the windings thereof conductively connected with the secondary winding portions of said supply transformer arranged at 180 electrical degrees relative to each other, and a direct current output line having one conductor thereof connected with the cathode of said rectifier and the other conductor thereof connected with the neutral point of said auto-transformer.

16. In an electric current rectifying system, a polyphase alternating current supply line, an electric current rectifier of the electron discharge type having a plurality of anodes and a cathode, a transformer having a primary winding connected with said supply line and a secondary winding divided into a number of portions, the secondary winding portions being severally connected with the anodes of said rectifier and being arranged in parallel pairs, the number of anodes of said device being greater than the number of phases of the secondary winding of said transformer an auto-transformer having the windings thereof connected to form a neutral point and having each of the windings thereof conductively connected with two pairs of secondary winding portions of said supply transformer of opposite phases, and a direct current output line having one conductor thereof connected with the cathode of said rectifier and the other conductor thereof connected with the neutral point of said auto-transformer.

ERWIN KERN.
HEINRICH MEYER-DELIUS.